UNITED STATES PATENT OFFICE.

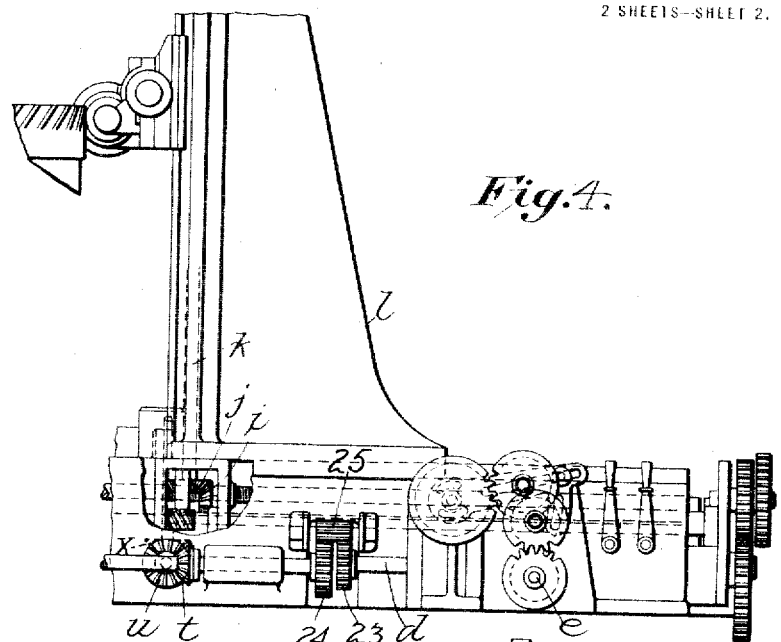
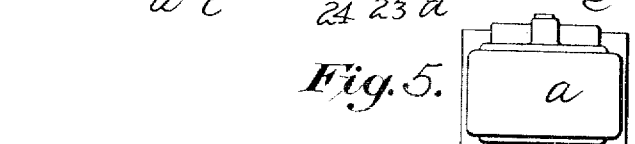
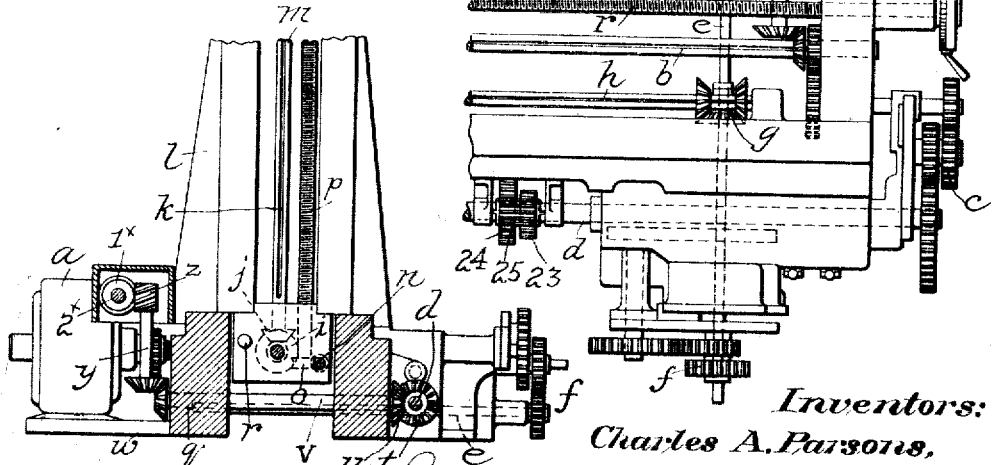

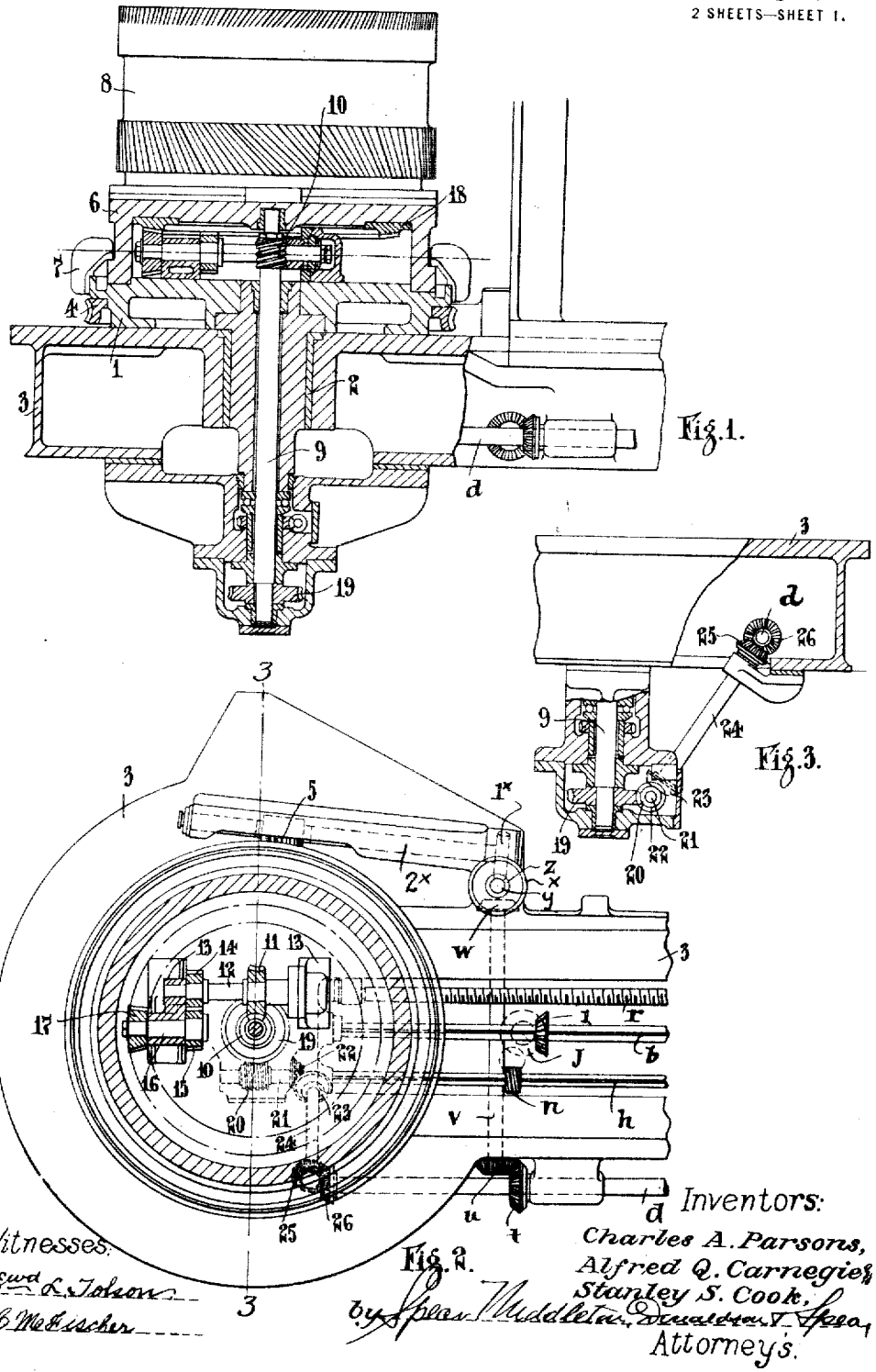

CHARLES ALGERNON PARSONS AND ALFRED QUINTIN CARNEGIE, OF NEWCASTLE-UPON-TYNE, AND STANLEY SMITH COOK, OF WALLSEND, ENGLAND; SAID CARNEGIE AND SAID COOK ASSIGNORS TO SAID PARSONS.

GEAR-CUTTING MACHINE.

1,274,585.   Specification of Letters Patent.   Patented Aug. 6, 1918.

Original application filed March 25, 1913, Serial No. 756,762. Divided and this application filed March 2, 1916. Serial No. 81,742.

*To all whom it may concern:*

Be it known that we, the Honorable Sir CHARLES ALGERNON PARSONS, K. C. B., of Heaton Works, Newcastle-upon-Tyne, Northumberland, England, ALFRED QUINTIN CARNEGIE, of Heaton Works, Newcastle-upon-Tyne, Northumberland, England, and STANLEY SMITH COOK, of Turbinia Works, Wallsend, Northumberland, England, subjects of the King of Great Britain and Ireland, have invented certain new and useful Improvements in Gear-Cutting Machines, of which the following is a specification.

This invention relates to methods and means for cutting the teeth in gear wheels, such as is described in Letters Patent of the United States, granted to us January 8, 1918, #1,252,482.

While the present machines cut the teeth with a high order of accuracy, a still higher degree of accuracy is desirable to insure the silent operation of gear wheels when transmitting large powers at high speeds, and also to minimize the wear of the teeth. It is obvious that with the processes already adopted the accuracy of the finished wheel cannot be greater than that of the parent gear of the machine by which the teeth are cut. Local irregularities in this parent gear cause irregularities in the teeth of the wheels being cut which exactly correspond in angular position with those of the parent gear, and which, when such wheels are in operation for the transmission of power, will give rise to periodic vibrations, often of high frequency, and therefore productive of noise. In the case, for instance, in which the table on which the work is mounted is rotated by means of a worm and a worm wheel, the latter being attached permanently to the table, it will be seen that the irregularities formed on the work are a function of the angular position of the table in relation to the position of the worm. The latter is usually fixed and since the cutter is also usually in a fixed position on the machine, and advances across the work in a direction parallel to the axis of the table, there will result lines of irregularities on the finished wheel lying in planes through the axis of the table, and therefore of the work mounted thereon.

It will be seen that irregularities so positioned will, when the wheel is at work, come into mesh simultaneously across the face of the wheel, thus causing irregularities in the relative rotational motion of the wheel and pinion engaging therewith. If, however, a small amount of rotary motion relative to the table be imparted to the work it will be seen that the irregularities formed in the work will be distributed spirally around the wheel, and that if this relative creep be considerable, these spirals will make a small angle with the plane of revolution of the wheel, and will consequently lie closely to each other, with the result that the pinion and wheel will, when geared together, preserve a constant relative angular velocity between them.

The present invention consists in improved means for distributing the irregularities formed in the work in spirals making a comparatively small angle with the plane of revolution of said work, whereby the periodic correspondence of said irregularities with the irregularities of the parent gear rotating the same is destroyed.

Referring to the accompanying drawings—

Figure 1 is a cross sectional elevation through the work carrying table and accompanying parts of a gear cutting machine embodying the present invention.

Fig. 2 is a part sectional plan of Fig. 1.

Fig. 3 is a section on the line 3—3 of Fig. 2.

Fig. 4 is a side view of that part of the machine which joins Fig. 1 on the right thereof.

Fig. 5 is a plan view of that part of the machine which joins Fig. 2 on the right.

Fig. 6 is a cross sectional view of Fig. 4, looking from the left.

In carrying the invention into effect, according to the present construction, a primary table 1 is provided, constrained to rotate about its axis by a bearing 2, in the bed member 3. Attached to the primary table 1 is an indexing worm wheel 4, with which a driving worm 5 engages. The worm 5 is driven by any suitable means from a main driving shaft 27. The elements 4 and 5 form a parent gear.

Upon the primary table 1 a secondary table 6 is rotatably mounted, and is held down to the table 1 by dogs 7.

The work 8 is mounted upon the secondary table 6, in any suitable manner.

The spindle 9, which is rotatable in suitable bearings co-axially with the primary table 1, carries at its upper end a worm 10. The worm 10 engages with a worm wheel 11 mounted upon a spindle 12 carried in suitable brackets 13, secured to the primary table 1. Also mounted upon the spindle 12 is a pinion 14, which engages a spur wheel 15, carried by the spindle 16, which is mounted in one of the brackets 13. Also attached to the spindle 16 is a bevel pinion 17.

To the under side of the secondary table 6 a bevel rack 18 is secured. The pinion 17 engages with the rack 18.

To the lower end of the spindle 9 a worm wheel 19 is secured. With the worm wheel 19 a worm 20 engages, mounted upon a spindle 21, which carries a bevel wheel 22, engaging a bevel 23, upon a spindle 24, which also carries a second bevel 25. The bevel 25 is engaged by a bevel 26, mounted upon an extension of the driving shaft 27.

The shaft 27 is driven from any suitable source, and is so connected in any well known manner with the hob drive and hob feed mechanism that the proper relations are maintained to produce the required pitch of the teeth cut on the work, and also the helical angle of the teeth when helical teeth are required to be cut.

The gearing connecting the primary and secondary tables and the gearing driving the spindle 9 are so arranged that when the shaft 27 is driven, the tables 1 and 6 are rotated in the direction in which the work 8 must rotate for the cutting of the teeth on the work, while the shaft 9 is rotated in the reverse direction to the tables.

In one construction shown in the above mentioned patent, the spindle 9 is stationary, and the effect of rotating the tables about the central spindle is to cause a relative movement between the tables, owing to the interposed gearing.

On rotating the shaft 27 in the present construction, and thus by the worm 5 driving the tables about the spindle 9, a similar effect to the above is produced, but owing to the backward rotation of the spindle 9 there results a greater relative motion between the tables than that due merely to the rotation of the gear train about 9. The relative motion due to the backward rotation of 9 can be made of any desired amount by varying the proportions of the gearing connecting 9 and 27.

Referring to Figs. 4, 5 and 6 which illustrate the connections to the hob and the hob feeding mechanism, it is to be noted that these are the same as those described in our patent above referred to.

The machine is driven by an electric motor $a$ which drives through suitable gearing the spindle $b$, from which motion is transmitted through suitable change speed gearing $c$ to the shaft $d$. Motion is also transmitted from the motor $a$ through the shaft $d$, to a cross shaft and gear wheels $f$, and through a reversing gear, $g$, to the spindle $h$. The gear wheels $f$, form a change gear by which the helical angle of the teeth formed on the work is controlled through the usual differential in shaft $d$. The shaft $e$ is a part of a connection for shifting reversing gears at $g$, said shaft being operated by the hand lever $16^x$. The spindle $b$, carries a bevel wheel, $i$, gearing with another bevel wheel, $j$, mounted on a vertical spindle $k$, mounted in the cutter standard $l$. The vertical spindle $k$, is provided with a feather-way $m$, by which its rotation is transmitted to the cutter. The spindle $h$, is provided with a worm $n$, which engages with a worm wheel $o$, on another vertical spindle $p$, mounted on the cutter standard $l$. This spindle $p$, is threaded and when rotated causes a vertical up or down movement of the cutter, thus moving the cutter across the face of the work. The cutter standard $l$, is provided with suitable means for being traversed longitudinally on the bed $q$ of the machine, by means of the threaded spindle $r$, which can be rotated by the hand wheel $s$.

The rotation of the shaft $d$, is transmitted direct or through suitable compensating gear as shown at 23, 24, 25, to a bevel wheel $t$, engaging with another bevel wheel $u$, on a horizontal shaft $v$, carrying at its other end another bevel wheel $w$. This engages with a yet further bevel wheel $x$, on a vertical shaft $y$, carrying at its other end a worm $z$ engaging with a worm wheel $1^x$, on a shaft $2^x$ provided with the worm 5.

Having now described our invention, what we claim as new and desire to secure by Letters Patent is:—

1. A gear cutting machine, comprising in combination a primary table, a parent gear for rotating the same comprising a driving and a driven member, said driven member being attached to said table, a secondary table on which the work is carried rotatably mounted on said primary table, a train of gearing mounted upon said primary table, the last member of said train being connected to said secondary table, a shaft co-axial with said table, gear means upon said shaft engaging the first member of said train, and means to rotate said shaft, a hob, means to rotate said hob, means between said hob rotating means and said index wheel rotating means to preserve correct indexing relation between the rotations of said hob and the rotations of said secondary table, means to feed said hob, and means between said hob feeding means and said indexing wheel rotating means to preserve correct lead relation between said hob feed and the speed of said table.

2. A gear cutting machine comprising in combination, a primary table, a secondary table, on which the work is carried, mounted on said primary table, a parent-gear rotating said primary table, and having a driving and a driven member, a rotating shaft coaxial with said table, a train of gearing carried by one of said tables, and connected to the other of said tables, and connected to the shaft coaxial with said tables, means for rotating said shaft from the driving member of said parent gear, whereby said secondary table is rotated by said driving and driven member of the parent gear, but at a different rate therefrom, a hob, means to rotate said hob, means between said hob rotating means and said index wheel rotating means to preserve correct indexing relation between the rotations of said hob and the rotations of said secondary table, means to feed said hob and means between said hob feeding means and said indexing wheel rotating means to preserve correct lead relation between said hob feed and the speed of said table.

3. A gear cutting machine comprising in combination, a primary table, means to rotate said table, a work-carrying secondary table rotatably mounted upon said primary table, a system of gearing positioned between the two tables, and acting to produce relative motion between them, means for driving said system of gearing, the axis of the final driving member of said system being caused to revolve about the axis of rotation of said work carrying table, in the same direction and at a different rate therefrom, while the first member of said system is positioned coaxially with said table, and caused to rotate, but in the opposite direction to said table, a hob, means to rotate said hob, means between said hob rotating means and said index wheel rotating means to preserve correct indexing relation between the rotations of said hob and the rotations of said secondary table, means to feed said hob and means between said hob feeding means and said indexing wheel rotating means to preserve correct lead relation between said hob feed and the speed of said table.

4. A gear cutting machine comprising in combination, a primary table, a parent gear for rotating the same, comprising a driving and a driven member, said driven member being attached to said table, means to rotate said driving member, a secondary table on which the work is carried rotatably mounted on said primary table, a shaft coaxial with said tables, means to rotate said shaft, a train of gearing mounted on said primary table, the last member of said train being connected to said secondary table, gear means upon said coaxial shaft engaging the first member of said train, said train being caused to rotate by the motion of said primary table, and the rotation of said coaxial shaft, a hob, means to rotate said hob, means between said hob rotating means and said index wheel rotating means to preserve correct indexing relation between the rotations of said hob and the rotations of said secondary table, means to feed said hob, and means between said hob feeding means and said indexing wheel rotating means to preserve correct lead relation between said hob feed and the speed of said table.

5. A gear cutting machine comprising in combination, a work carrying table, an index wheel, a gear train, means to rotate the first member of said train, the final member of said train being connected to said table, a member of said train between said first member and said final member being connected to said index wheel, a hob, means to rotate said hob, means between said hob rotating means and said index wheel rotating means to preserve correct indexing relation between the rotations of said hob and the rotations of said work carrying table, means to feed said hob, and means between said hob feeding means and said indexing wheel rotating means to preserve correct lead relation between said hob feed and the speed of said table.

6. A gear cutting machine comprising in combination, a work-carrying table, an index wheel, means to rotate said index wheel, a gear train, the final member of said train being connected to said table, a member of said train between the first member and final member being carried by said index wheel, and the first member of said train being connected to said index wheel driving means, to be operated thereby, a hob, means to rotate said hob, means between said hob rotating means and said index wheel rotating means to preserve correct indexing relation between the rotations of said hob and the rotations of said work-carrying table, means to feed said hob, and means between said hob feeding means and said indexing wheel rotating means to preserve correct lead relation between said hob feed and the speed of said table.

In testimony whereof, we have affixed our signatures.

CHARLES ALGERNON PARSONS.
ALFRED QUINTIN CARNEGIE.
STANLEY SMITH COOK.